March 25, 1952   F. J. FONTEIN   2,590,691
PROCESS FOR THE SEPARATION OF SOLID SUBSTANCES
OF DIFFERENT SPECIFIC GRAVITY AND GRAIN SIZE
Filed April 23, 1946
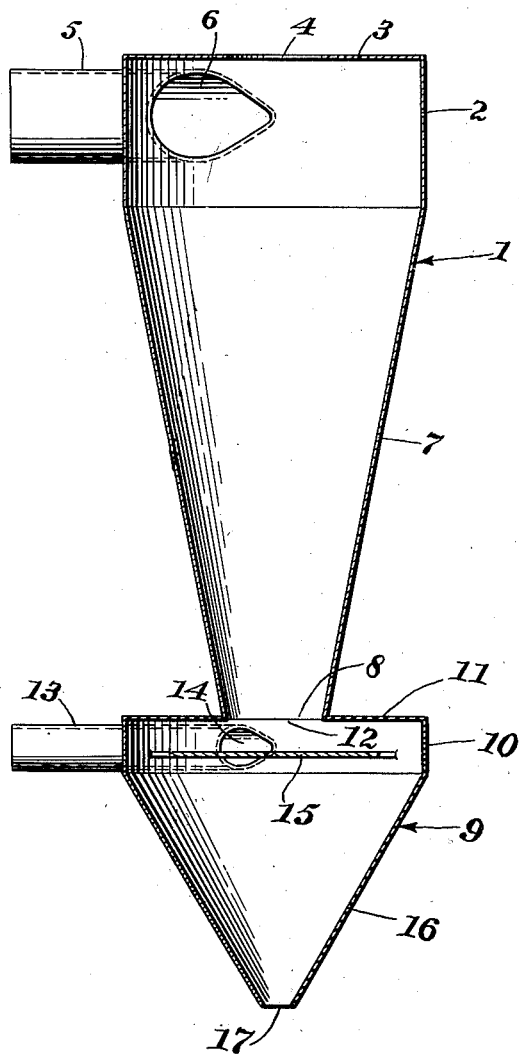
Inventor:
Freerk J. Fontein,
By Cushman Darby & Cushman
Attorneys.

Patented Mar. 25, 1952

2,590,691

UNITED STATES PATENT OFFICE 2,590,691

PROCESS FOR THE SEPARATION OF SOLID SUBSTANCES OF DIFFERENT SPECIFIC GRAVITY AND GRAIN SIZE

Freerk Jan Fontein, Heerlen, Netherlands, assignor to De Directie van de Staatsmijnen in Limburg, Heerlen, Netherlands, acting for and on behalf of the State of the Netherlands Application April 23, 1946, Serial No. 664,321 In the Netherlands July 31, 1945

11 Claims. (Cl. 209—173)

This invention relates to process and apparatus for the separating of solid substances of different specific gravity and grain size and the aid of a separating solids in liquid suspension in a hydrocyclone, sometimes hereinafter referred to merely as cyclone.

In the copending applications of Driessen, Krygsman and Leeman, Serial Nos. 664,320, now Patent No. 2,543,689, for Process for the Separation of Solids of Different Specific Gravity and Grain Size, and 664,323, now abandoned, for Method of Separation, filed April 23, 1946, a process is described in which separation of mixtures of solid substances of different specific gravity and grain size is effected in a cyclone utilizing a suspension containing added relatively fine particles of specific gravity higher than the specific gravity of separation. These relatively fine particles cause a concentration in the separating zone such that the larger particles of specific gravity below the specific gravity of separation are prevented from leaving the cyclone at the apex, as would be the tendency in the absence of the added relatively fine particles, and sharp separation is obtained. A considerable quantity of the added relatively fine particles leave with the mixture particles of specific gravity higher than the specific gravity of separation at the apex of the cyclone. The smallest of the added relatively fine particles leave the cyclone at its base opening along with the mixture particles having a specific gravity lower than the specific gravity of separation. These relatively fine particles should be removed since, for example, in the case of coal, their presence will mean a higher ash content, while those leaving the cyclone at the apex with the shale should be recovered for re-use. The difficulties of such recovery increase accordingly as the size of the mixture particles to be separated is smaller, because separation of the added relatively small particles is the more difficult as they approach in size the size of the mixture particles.

The object of the present invention is to simplify the recovery problem by greatly reducing the amount of the relatively fine particles permanently leaving the cyclone at the apex. This is accomplished by introducing into the apex of the cyclone a stream of liquid in a direction counter to the discharge direction.

This can be accomplished by arranging the cyclone to discharge into a receiver provided with outlet means for the solids and provided with an inlet for the supply of fluid whereby a stream is caused to flow into the apex of the cyclone counter to the discharge direction. This stream drives the relatively small particles back into the cyclone so that the discharge at the apex will, in the main, contain the larger particles of a specific gravity higher than the specific gravity of separation, these being in general particles of the mixture to be separated. Ordinarily the fluid fed to the receiver is the same as the suspension liquid which is usually water. However, it is possible to supply a suspension also to the receiver and the specific gravity of such suspension need not necessarily be the same as that of the suspension fed to the cyclone.

A second cyclone is desirably used as the receiver and such an arrangement is shown in the accompanying drawing.

Referring to the drawing, which is an axial section of apparatus in accordance with the invention, reference numeral 1 designates a main cyclone having a cylindrical upper portion 2 provided with an annular end wall 3 defining an axial discharge opening 4. Reference numeral 5 designates a supply pipe directed tangentially into portion 2 through an opening 6. Portion 2 surmounts a coaxial conical portion 7 having an axial apex opening 8, so that the form of the cyclone is generally conical.

Reference numeral 9 designates a second cyclone having a shallow cylindrical portion 10 provided with an annular end wall 11 which defines an outlet opening 12. The apex end of the first cyclone is connected through a tight joint with the end wall 11 around the opening 12 so that the latter and apex opening 8 are coincident. Reference numeral 13 designates a supply pipe directed tangentially into portion 10 through an opening 14 and reference numeral 15 designates a baffle supported below the opening 12 by radial arms projecting from the side wall of the portion 10 so that except for the arms, the baffle is spaced inwardly of the said side wall. Portion 10 surmounts a coaxial conical portion 16 having an axial apex opening 17.

In operation, the suspension containing the mixture to be separated and the added relatively fine particles is introduced under pressure into the first cyclone through pipe 5 and a vortex is formed wherein the centrifugal force is greatly in excess of the gravitational force. The heavier particles move to the outside of the vortex and form a stratum moving toward and through the apex opening. The mixture particles of specific gravity lower than the specific gravity of separation move into an inner stratum travelling upwardly to discharge through the base opening 4.

The liquid or suspension introduced into the second cyclone through the pipe 13 likewise forms inner and outer strata of which the inner moves upwardly past baffle 15 and into the apex of the first cyclone. This upwardly moving stream carries the relatively fine particles of high specific gravity back into the first cyclone and as they rise they move under centrifugal force back into the outer stratum in the first cyclone and are re-circulated.

Due to this re-circulation, the amount of relatively fine particles necessary in the suspension introduced into the first cyclone is greatly reduced. For example, if using a simple cyclone 1 the supplied suspension must have a specific gravity of 1.3 to maintain a specific gravity of separation of 1.45, by adding the receiver 9 of the present invention a specific gravity of 1.05 of the suspension supplied to the first cyclone will be sufficient to maintain the specific gravity of separation of 1.45.

Pipe 5 carries the material to be treated into the apparatus. Pipe 13 is a means to maintain a vortex in a part of the apparatus. Thus, it is that pipe 13 can be considerably smaller than pipe 5, as shown. The major part of the liquid will be discharged with the light fraction, so it is important that opening 4 be larger than opening 17. Opening 12 should be large enough to permit passage of a considerable apex discharge from the upper cyclone into the lower cyclone, plus passage of a considerable overflow from the lower cyclone into the upper one. Therefore, opening 12 should be larger than opening 17, as shown. The infeed pressure in pipe 13 is independent of the infeed pressure in pipe 5, and in general the infeed pressure in pipe 13 will be smaller than the infeed pressure in pipe 5. The infeed pressure in pipe 13 may be increased to decrease the amount of fines in the final heavy fraction that is discharged through aperture 17. On the other hand, this pressure should not be increased too much, because otherwise the operation of the upper cyclone will be hampered.

The baffle 15 favorably affects the operation of the apparatus by preventing too strong an upward current at the apex of the first cyclone but with an appropriate regulation of forces in the receiving cyclone, the baffle may be omitted. The liquid discharging at 17 contains substantially only the larger particles of relatively high specific gravity and require only to be de-watered. Since only the smallest particles of high specific gravity leave the first cyclone at its base opening separation from the larger constituents leaving at this end can be readily effected, as by screening. The great majority of the added relatively fine particles which according to prior practice left the cyclone at the apex and had to be recovered now remain in the cyclone for reuse. Smaller particles could be kept in the second cyclone by having it discharge into a third similar cyclone.

Another advantage arising from the invention is that the apex opening of the separating cyclone 1 can have a greater diameter without unfavorably affecting the specific gravity of separation and still without substantial loss of the added relatively fine particles. Thus, particles that might otherwise clog or detrimentally narrow the apex opening, can pass unhindered and larger sizes of materials can be separated.

While in the above description particular reference has been made to the practice of the invention adding relatively fine particles in accordance with the mentioned applications, in some cases the mixture to be separated already has an adequate content of relatively fine particles of the heavier constituent or constituents. The invention is equally applicable in such case. While the actual relatively fine particle content might be inadequate to secure a sharp separation in a simple cyclone, the effect secured by re-circulation in accordance with this invention will compensate for the small actual content in the original suspension.

It will be understood that the invention is not limited to the specific disclosure herein but extends to variations falling within the claims which follow.

I claim:

1. In combination, a pair of hydrocyclones, each of generally conical form and having a tangential inlet at its base end with both inlets similarly directed to effect a vortex in each rotating in the same direction, an apex opening, and a base opening aligned with its apex opening, the apex opening of one hydrocyclone forming the base opening of the other.

2. Structure according to claim 1, wherein said other of said hydrocyclones includes flow-retarding baffle means in advance of its base opening and extending transversely to the axis of that other hydrocyclone.

3. In combination, a pair of hydrocyclones, each of generally conical form and having a tangential inlet at its base end with both inlets similarly directed to effect a vortex in each rotating in the same direction, an apex opening, and an annular end wall at its base defining an opening aligned with its apex opening, the apex end of one hydrocyclone being joined with the end wall of the other around the wall opening so that the apex opening of one coincides with the base opening of the other.

4. In combination, a first and a second hydrocyclone chamber each provided with a base wall and a conical side wall, the apex defined by the conical side walls being provided with a central opening and the base walls being provided with an opening co-axial with the apex opening, at least one tangentially located inlet in the side walls adjacent the base wall of each chamber and each facing in the same direction relative to the circumference of said chambers for forming a vortex in each rotating in the same direction, said chambers being secured together in sealed relationship with the apex opening of the first chamber directly opening into the base opening of the second chamber, and means for delivering through each inlet liquid under pressure sufficient to generate in the chambers centrifugal forces significantly in excess of gravity with the liquid introduced into the first chamber containing diverse solids to be classified, whereby specifically heavier coarse solids discharge through the apex opening of the second chamber while specifically lighter solids and specifically heavier fines discharge through the base opening of the first chamber.

5. Apparatus according to claim 4, wherein the inlet to the second chamber is smaller than the inlet to the first chamber.

6. Apparatus according to claim 4, wherein the base opening of the first chamber is larger than the apex opening in the second chamber.

7. Apparatus according to claim 4, wherein the apex opening of the first chamber is larger than the apex opening in the second chamber.

8. The process of separating a liquid suspension of solids of different grain size and different specific gravity into one fraction containing solids of lighter specific gravity including heavier fines and one fraction of all other solids, which comprises establishing and maintaining a first and a second confined conical body of such suspension each having a base outlet for the outward passage of fines and an aligned apex outlet for the outward passage of the other fraction, controllably supplying liquid tangentially to the base of each body in a direction and with sufficient force to rotate each body vortically and in the same rotational direction at a speed generating centrifugal force significantly in excess of gravity for effecting said outward passages, and effecting two-way hydraulic communication between the bodies to make the apex outlet of one coincident with the base outlet of the other through which centrifugal action in the second body returns to the first body fines that have passed therefrom to the second whereby the fines fraction is emitted from the base outlet of the first body and the other fraction is emitted from the apex outlet of the second body.

9. The process according to claim 8, wherein solids introduced into the first body include relatively fine solids of a specific gravity at least as heavy as that of the solids to be emitted from the apex outlet of the second body.

10. The process according to claim 8, with the addition of retarding the two-way hydraulic communication.

11. The continuous process of separating solids of different specific gravity and particle size, comprising simultaneously feeding under pressure tangentially into an end portion of a primary confined conical liquid body a suspension of a mass of such solids to move in a cyclonic vortex within the body wherein centrifugal forces will be substantially in excess of gravitational forces, a portion of such fed solids being of substantially finer size than the remainder of the solids and of a specific gravity higher than a predetermined specific gravity of separation, discharging liquid and suspended solids while under pressure created by said feed from two outlets co-axial of the body of which one opens from the body adjacent the point of in-feed while the second one opens from the apex of the body, supplying said portion of finer solids in such quantity and restricting the discharge from the apex outlet of the primary body so that a concentration of the finer and higher specific gravity solids is established and maintained in a zone adjacent the apex outlet of the body to obstruct discharge from the apex outlet of solids of a specific gravity lower than the specific gravity of separation so that the fraction discharging through the first outlet contains substantially all solids of a specific gravity lower than the specific gravity of separation and the fraction discharging through the apex outlet contains substantially only solids of a specific gravity higher than the specific gravity of separation, receiving the fraction discharging through the apex outlet into a secondary confined conical liquid body having an apex outlet and at a point remote therefrom but co-axial therewith being in hydraulic communication with the apex outlet of the primary body while the secondary liquid body has a lower specific gravity than the larger particles received therein, and supplying liquid under pressure in a tangential direction to the secondary body sufficient to effect therein a cyclonic vortex rotating in the same direction as that in the primary body whose intensity establishes and maintains a finer-solids-entraining-flow back through the apex outlet of the primary body counter to said apex discharge, for returning such finer solids back to the primary body whereby such finer solids are discharged from the first outlet of the primary body while other solids are discharged from the apex outlet of the secondary body.

FREERK JAN FONTEIN.

REFERENCES CITED

The following references are of record in the file of this patent:

UNITED STATES PATENTS

| Number | Name | Date |
| --- | --- | --- |
| 762,870 | Allen | July 21, 1904 |
| 1,149,463 | Pardee | Aug. 10, 1915 |
| 1,197,946 | Pardee | Sept. 12, 1916 |
| 1,392,401 | Chance | Oct. 4, 1921 |
| 1,629,182 | Stull | May 17, 1927 |
| 1,897,144 | Prouty | Feb. 14, 1933 |
| 1,908,181 | Prouty | May 9, 1933 |
| 2,052,004 | Remick | Aug. 25, 1936 |
| 2,104,537 | Ellis | Jan. 4, 1938 |
| 2,146,672 | Ellis | Feb. 7, 1939 |
| 2,179,919 | Carr | Nov. 14, 1939 |
| 2,252,581 | Saint-Jacques | Aug. 12, 1941 |
| 2,312,706 | Freeman | Mar. 2, 1943 |
| 2,377,524 | Samson | June 5, 1945 |

FOREIGN PATENTS

| Number | Country | Date |
| --- | --- | --- |
| 115,681 | Sweden | Nov. 22, 1945 |